May 28, 1968 R. S. BAKER 3,384,939
CLOSED PATH CONCRETE FORMING AND CURING APPARATUS
Original Filed Feb. 11, 1964 13 Sheets-Sheet 2
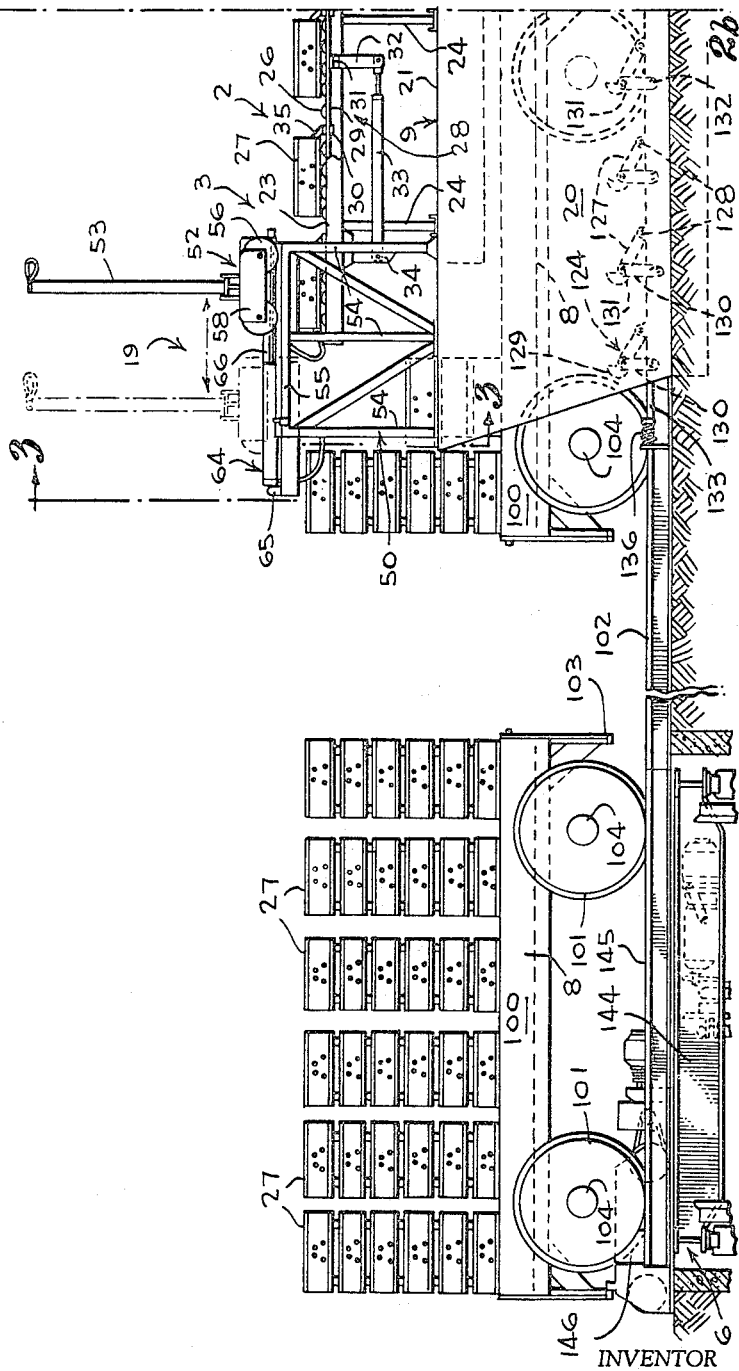
INVENTOR
ROBERT S. BAKER
BY Mason, Fenwick & Lawrence
ATTORNEYS May 28, 1968  R. S. BAKER  3,384,939
CLOSED PATH CONCRETE FORMING AND CURING APPARATUS
Original Filed Feb. 11, 1964  13 Sheets-Sheet 3
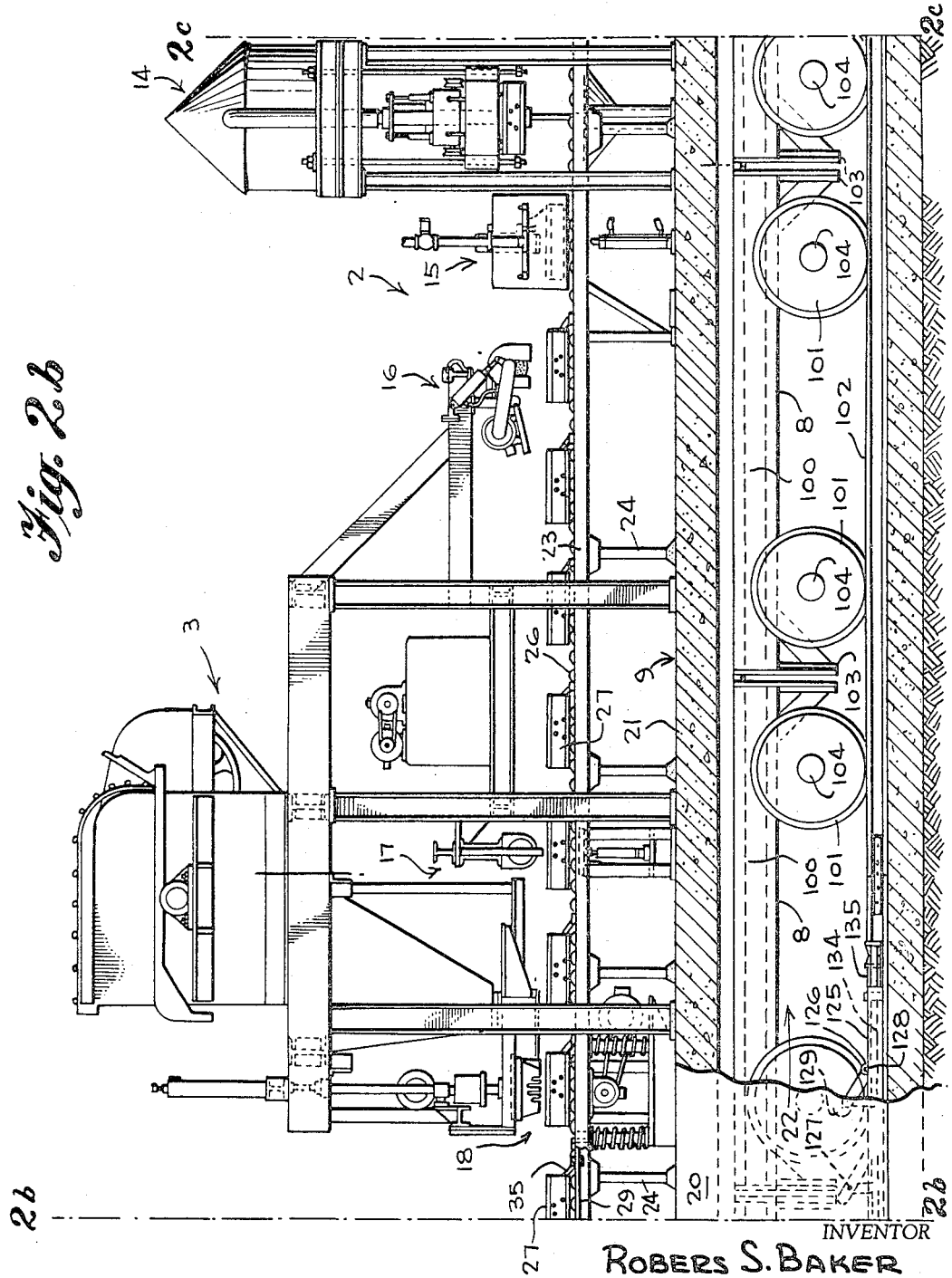
INVENTOR
ROBERS S. BAKER
BY Mason, Fenwick & Lawrence
ATTORNEYS

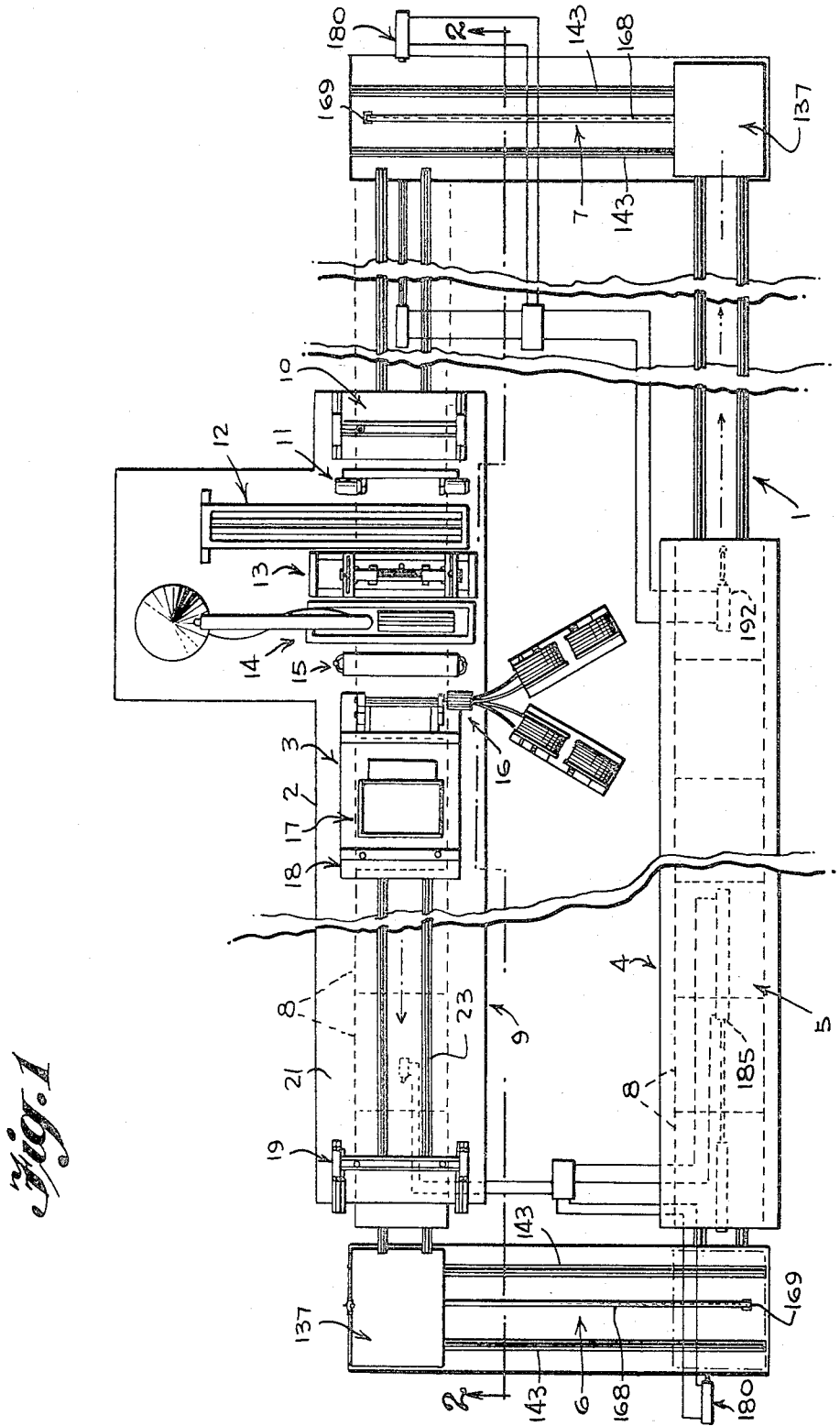

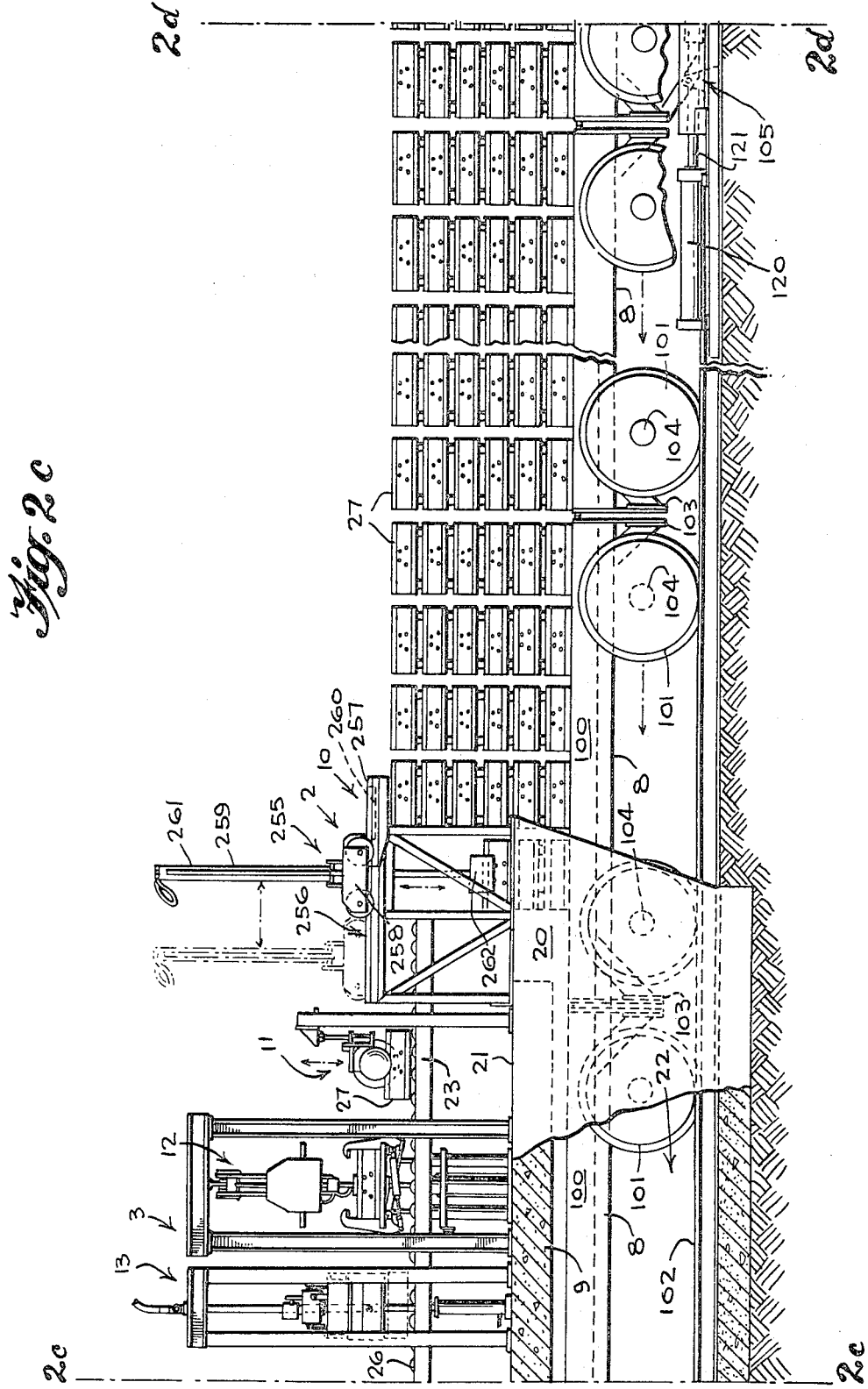

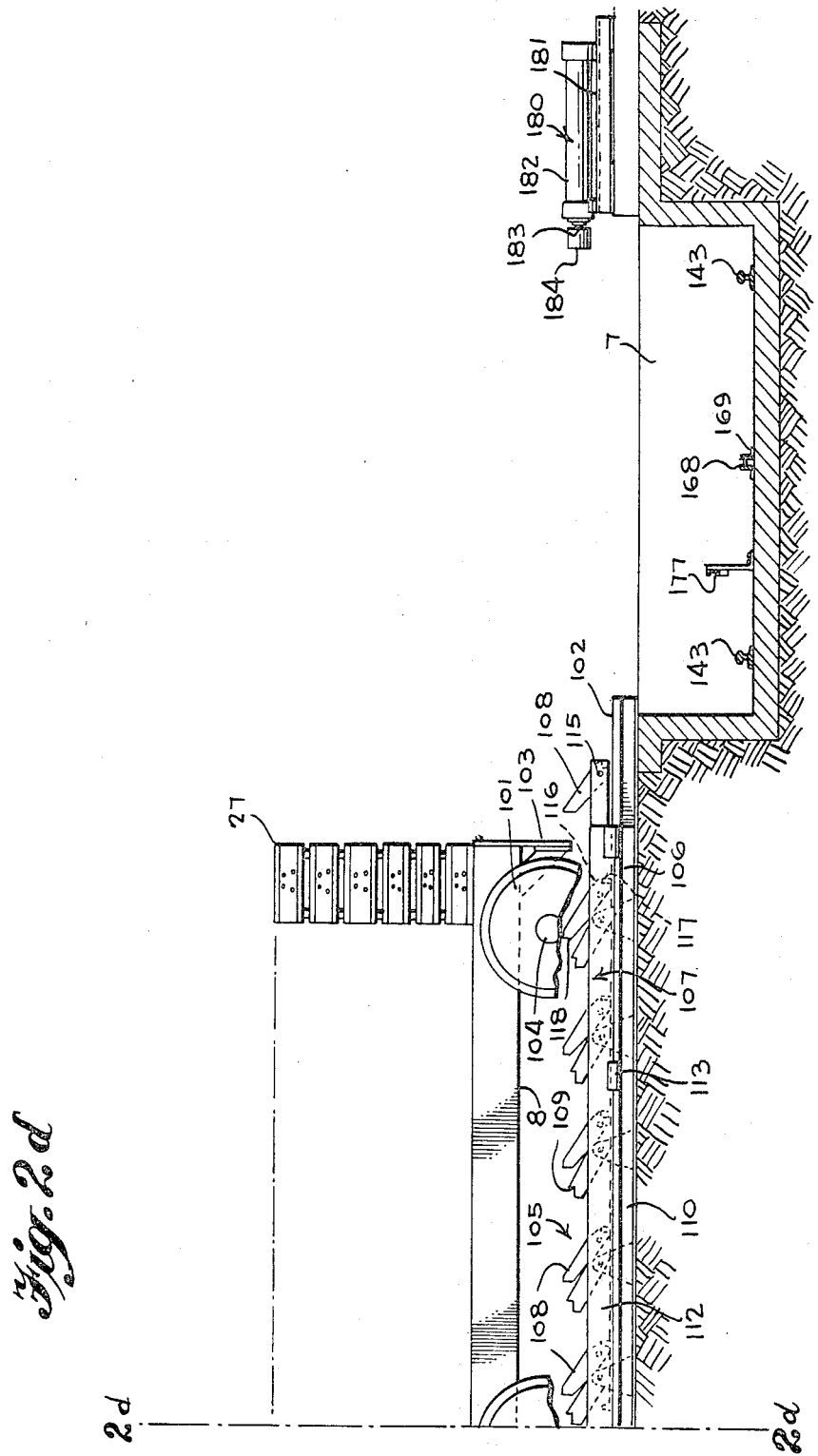

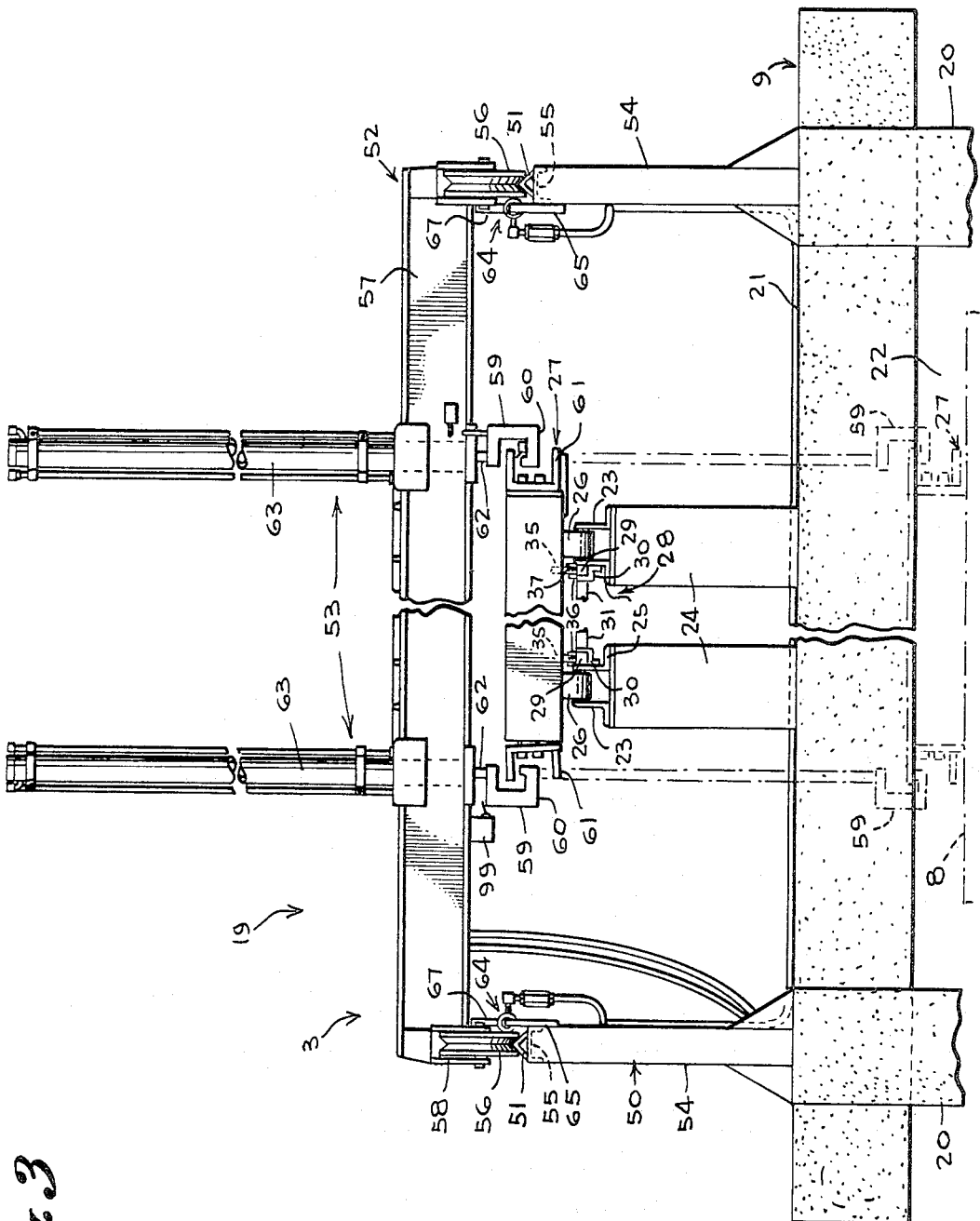

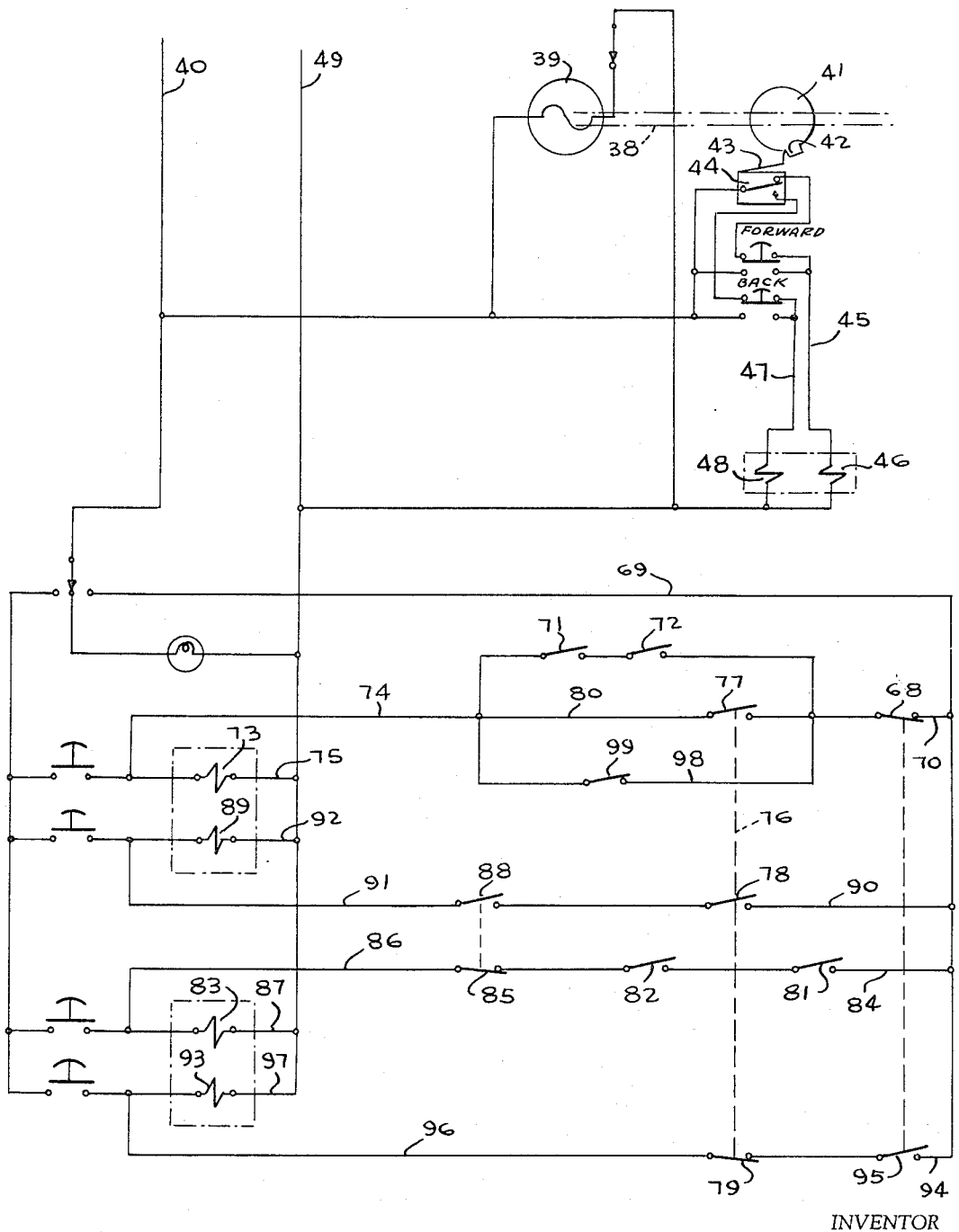

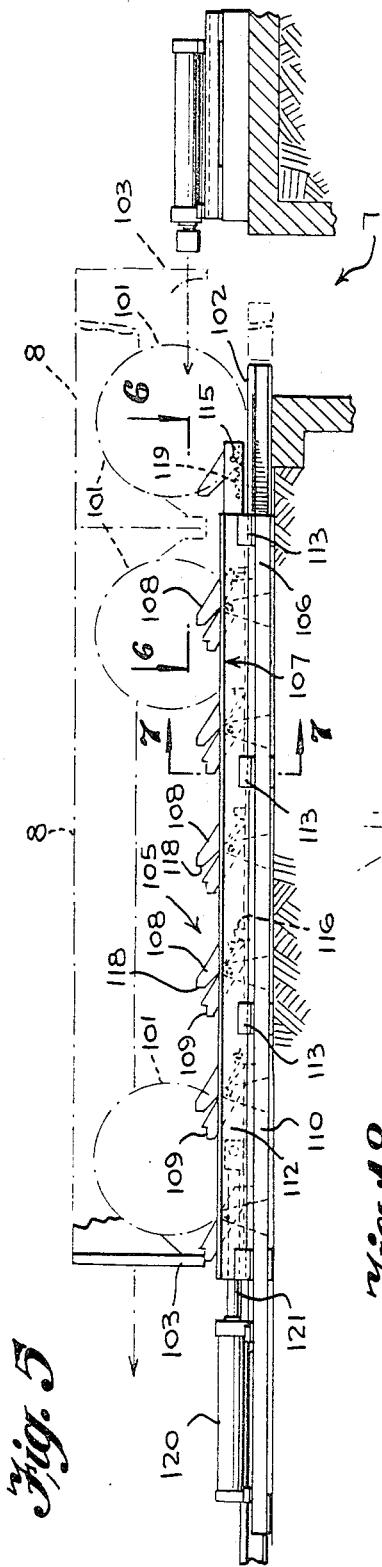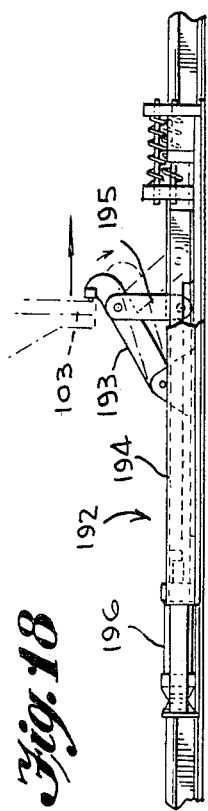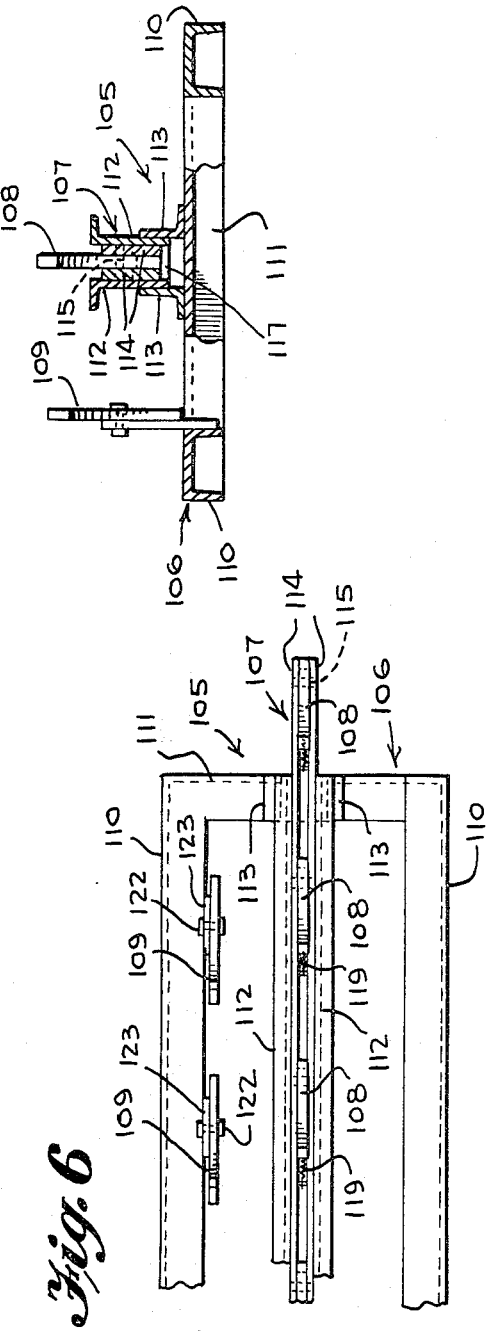

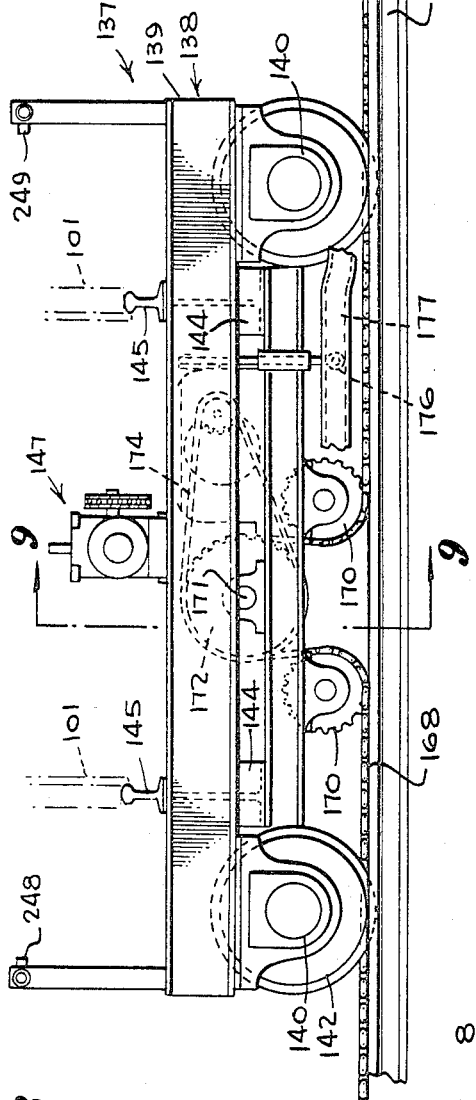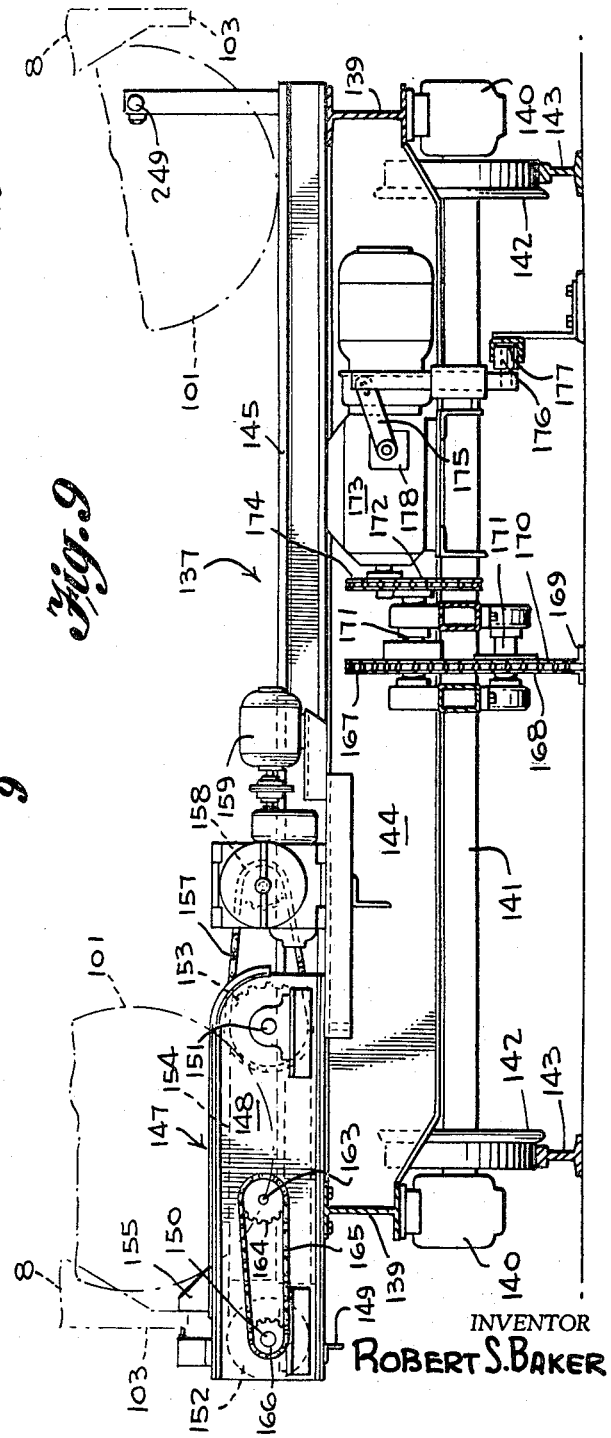

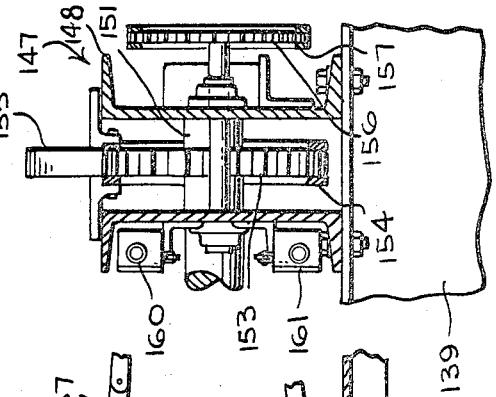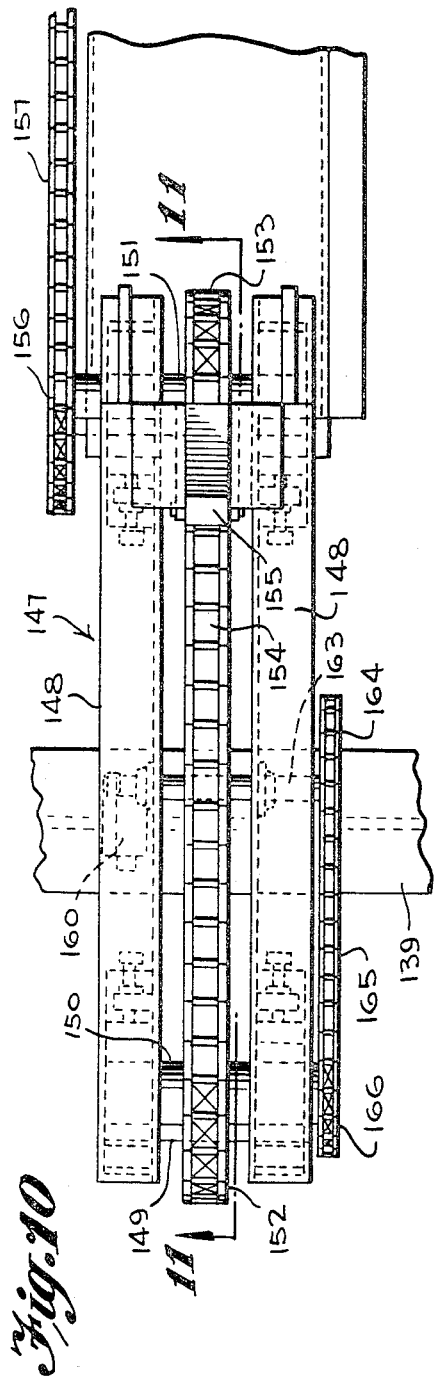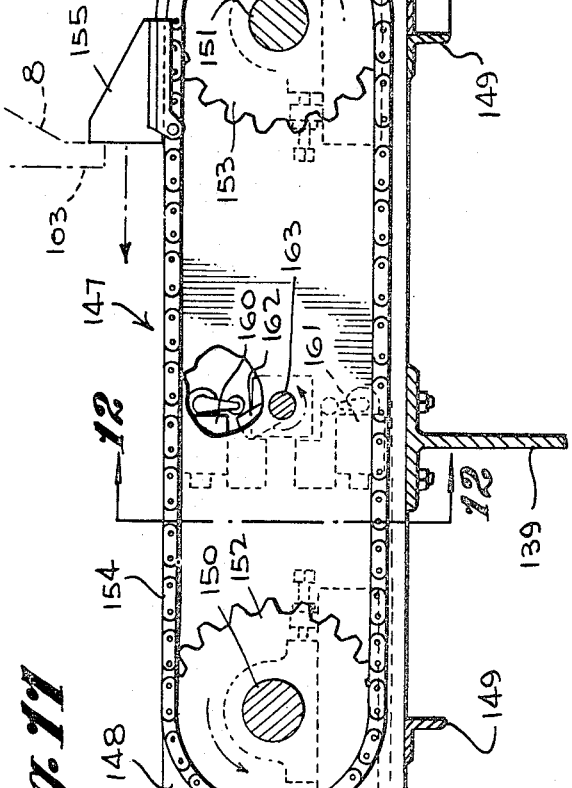

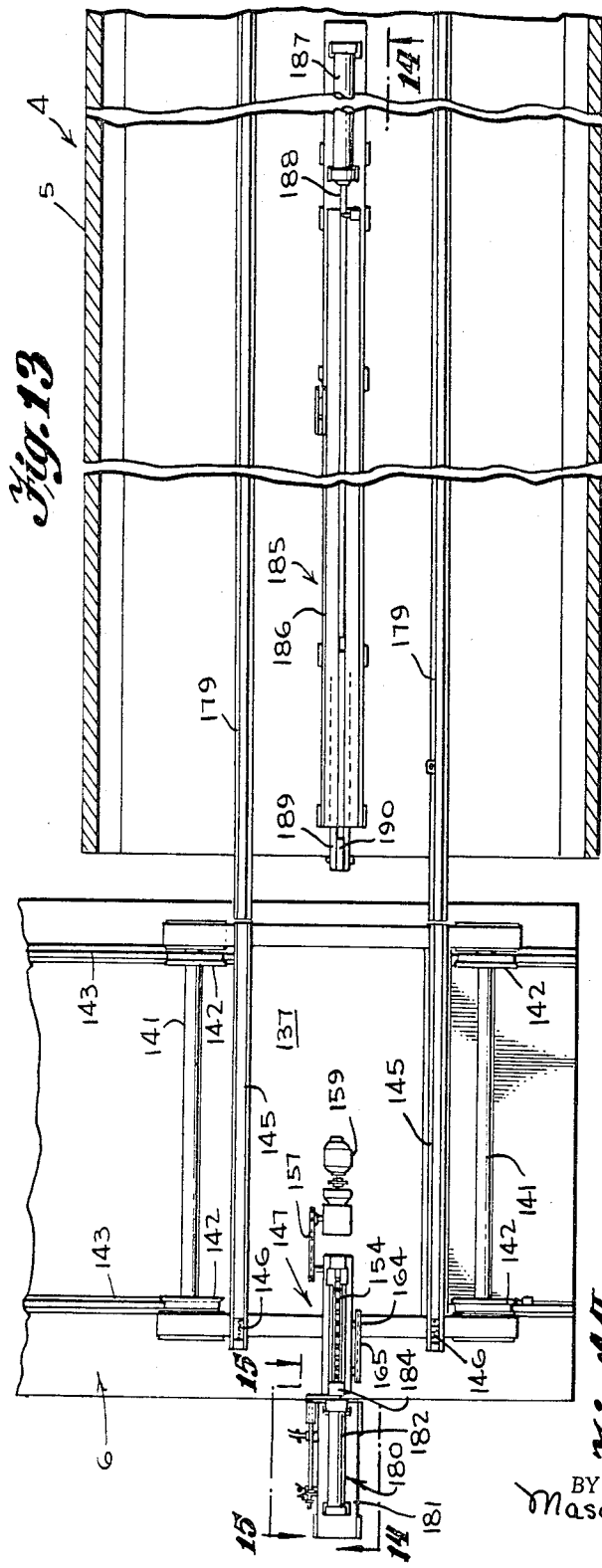
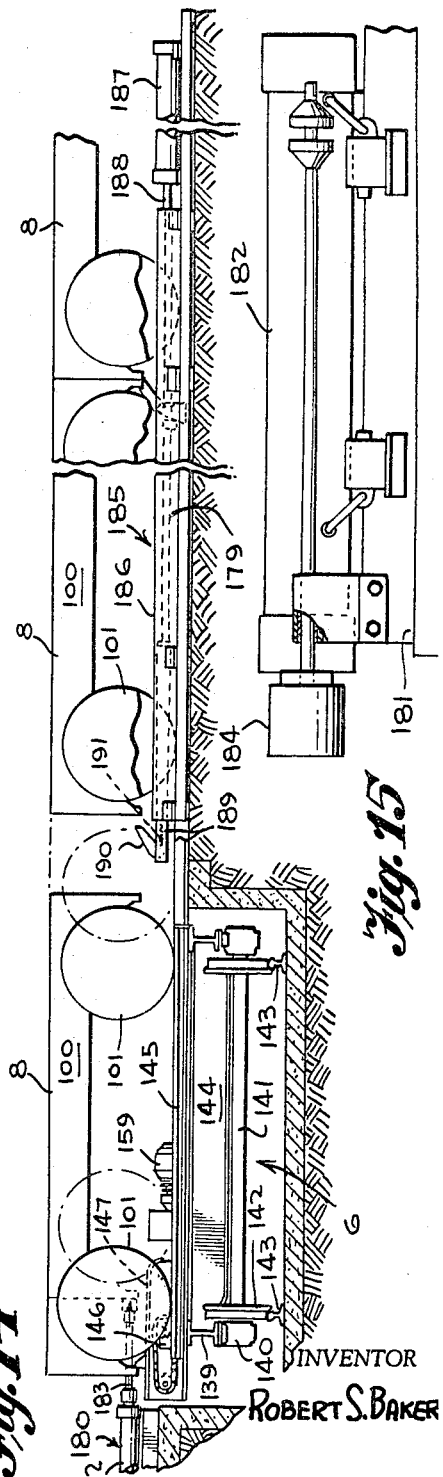

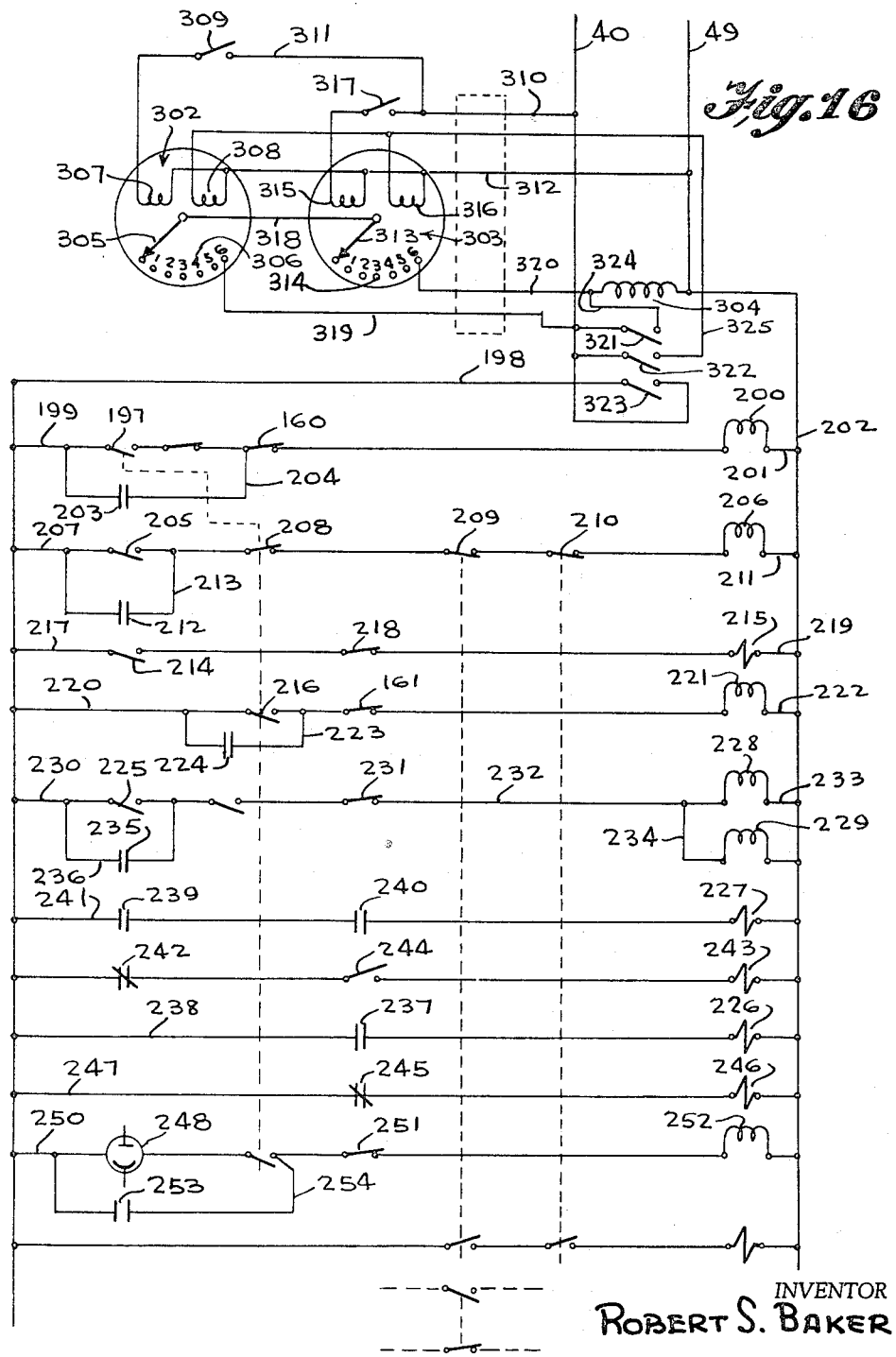

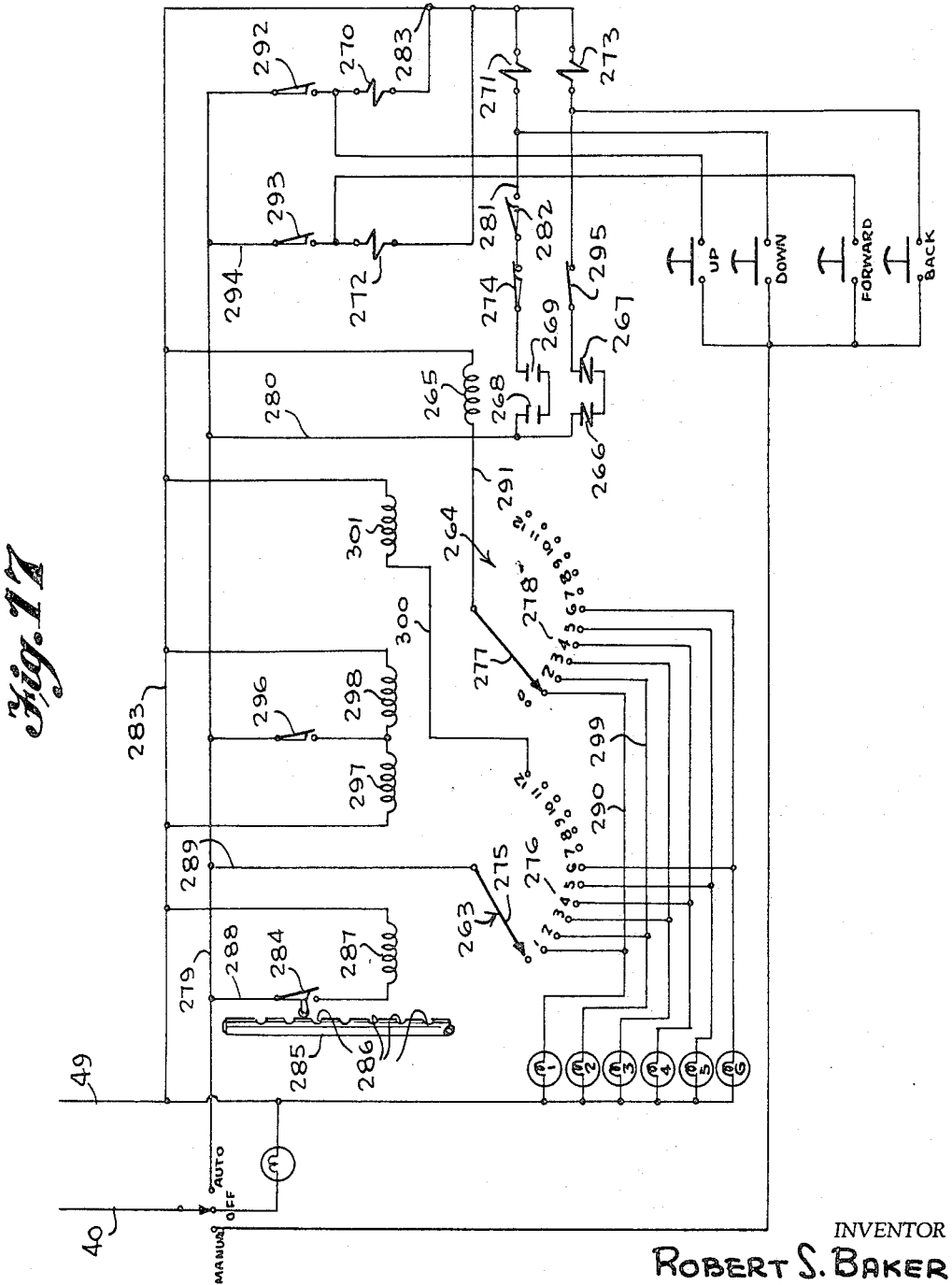

United States Patent Office

3,384,939
Patented May 28, 1968

3,384,939
CLOSED PATH CONCRETE FORMING AND CURING APPARATUS
Robert S. Baker, Tampa, Fla., assignor, by mesne assignments, to American Concrete Crosstie Corporation, Tampa, Fla., a corporation of Florida
Original application Feb. 11, 1964, Ser. No. 344,095, now Patent No. 3,305,907, dated Feb. 28, 1967. Divided and this application Feb. 27, 1967, Ser. No. 618,743
7 Claims. (Cl. 25—2)

ABSTRACT OF THE DISCLOSURE

Apparatus for moving stackable articles around an orbital path having a machine over one leg of the path, including cars which are moved along the path and means for removing articles singly from the machine and arranging them in stacks on the cars. There are also means for removing articles singly from the stacks on the cars and placing them on the machine. Means are included for moving articles singly along the machine from the end upon which the articles are placed to the end from which they are removed. The orbital path includes a leg in addition to the machine leg, and there are means for transferring loaded cars from one leg of the path to the other.

CROSS-REFERENCE TO RELATED APPLICATION

This application is a division of co-pending application of Robert S. Baker, Ser. No. 344,095, filed Feb. 11, 1964, now Patent No. 3,305,907 for Machine for Making Prestressed Concrete Members.

BACKGROUND OF THE INVENTION

This invention relates to apparatus for transporting pallets about a closed path, or orbit, one leg of which contains a concrete forming machine, and the other leg of which includes a curing tunnel.

In my prior Patent No. 3,128,521 issued Apr. 14, 1964, entitled Apparatus for Molding Prestressed Concrete Members, there is disclosed a machine for making prestressed concrete railroad ties, wherein pallets of particular construction are loaded onto the machine, oriented relative to the machine, and carried through a plurality of operating stations. The pallet is a self-contained unit having means for receiving stressing cables and holding them stressed while the concrete member is poured and cured. The pallets have to be loaded on the machine and unloaded therefrom manually, and require special handling during curing of the concrete members and removal of the members from the pallets.

SUMMARY OF THE INVENTION

The principal object of the present invention is to provide apparatus which will cause pallets to move along a concrete member forming machine, transfer the loaded pallets onto cars, carry them through a curing tunnel, and back to the opposite end of the member forming machine where they are retransferred to the member forming machine for removal of the cured members.

Another object is the provision of such apparatus which will provide a pallet transporting system operating through a closed path, or orbit, picking up pallets with freshly cast members from the forming machine at one point in the orbit, carrying them through a curing tunnel, and, at another point in the orbit, reloading the pallets on the forming machine, the transporting means continuing its orbit unloaded from the point of deposit of the pallets on the forming machine to the point of loading pallets from the forming machine.

A more specific object is to provide apparatus of this type wherein the pallets, after being placed on the forming machine, are moved along a pallet path which is parallel to the portion of the transporting means orbit from the point of deposit of pallets on the forming machine to the point of loading the pallets onto the transporting means.

A more specific object is to provide novel means for loading and unloading the pallets to and from the member forming machine.

It is also an object to provide a new type of transfer car to shift the pallet transporting cars from the forming machine leg of their orbital path to the curing tunnel leg and back.

Other objects of the invention will become apparent from the following description of one practical embodiment thereof when taken in conjunction with the drawings which accompany, and form part of, this specification.

BRIEF DESCRIPTION OF THE DRAWINGS

FIGURE 1 is a schematic plan view illustrating the layout of the entire apparatus of the present invention;

FIGURES 2A, 2B, 2C and 2D together show a section taken on the line 2—2 of FIGURE 1 and illustrate in side elevation the means for transporting the pallet along the concrete member forming machine;

FIGURE 3 is a vertical section taken on the line 3—3 of FIGURE 2A, illustrating in elevation the means for unloading pallets from the machine nad stacking them on a kiln car;

FIGURE 4 is a diagrammatic view of the electric circuit controlling operation of the means for unloading pallets from the machine onto transfer cars;

FIGURE 5 is a longitudinal vertical section at the entrance end of the machine, showing the means for moving the kiln cars along the machine leg of the orbit;

FIGURE 6 is a top plan view of a portion of the car advancing means shown in FIGURE 6;

FIGURE 7 is a transverse section taken on the line 7—7 of FIGURE 5;

FIGURE 8 is a side elevation of one of the transfer cars used to transport kiln cars from the machine leg of the orbit to the curing tunnel leg, and from the curing tunnel leg to the machine leg;

FIGURE 9 is an enlarged vertical section through the transfer car taken on the line 9—9 of FIGURE 8;

FIGURE 10 is an enlarged top plan view of means on the transfer car for pulling kiln cars onto the transfer car;

FIGURE 11 is a section taken on the line 11—11 of FIGURE 10;

FIGURE 12 is a section taken on the line 12—12 of FIGURE 11;

FIGURE 13 is a top plan view, partly in section, of one corner of a transfer pit in an adjacent section of the curing tunnel, showing a transfer car in position at the end of the curing tunnel, and the means for moving kiln cars form the transfer car into the tunnel;

FIGURE 14 is a vertical section taken on the line 14—14 of FIGURE 13;

FIGURE 15 is a section on an enlarged scale taken on the line 15—15 of FIGURE 13;

FIGURE 16 is a diagrammatic view of the electric circuits for controlling movement of the kiln cars throughout their orbital path, and the means for coordinating movement of the kiln cars to the operation of the machine;

FIGURE 17 is a diagrammatic view of the control circuits for the means for lifting pallets with cured concrete members from kiln cars and loading them onto the entrance end of the machine; and FIGURE 18 is a side elevation of the kiln car positioning means within the curing tunnel, parts being broken away to show interior structure.

DESCRIPTION OF THE PREFERRED EMBODIMENT

Apparatus in general

In general, the apparatus of the present invention includes a concrete member forming unit, or machine, which has mechanism at the entrance end for lifting pallets carrying cured concrete members from a transport means onto the machine, removing the cured concrete members from the pallets, preparing the pallets for another molding process, forming the members on the prepared pallets, and transferring the loaded pallets back to the transporting means at the discharge end of the forming machine, whereupon they are carried through a curing tunnel and again to the forming machine. The pallet transporting means moves along a fixed, closed orbit, with the pallets being transferred to the forming machine for unloading and reloading, and then being returned to the transporting means.

Referring to the drawings in detail, and first to FIGURE 1, there is shown diagrammatically the plan of the entire apparatus. It consists of a rectangular orbit, or path, 1 for a pallet transporting means. The transporting path includes a leg 2 along and above which a concrete member forming machine 3 is located, and a parallel leg 4, substantially the whole length of which is enclosed by curing tunnel 5. Connecting the ends of the legs 2 and 4, and completing the orbit, are transfer pits 6 and 7, along which transporting cars 8 are shifted from the forming machine leg 2 of the orbit to the tunnel leg 4, and from the tunnel leg to the forming machine leg.

The tunnel 5 may be a conventional curing tunnel having appropriate heating means, not shown, to provide the necessary curing atmosphere for the concrete members. As the tunnel structural detail forms no part of the present invention, it has not been illustrated, and will not be described. The means for advancing the transporting cars 8 through the tunnel will be referred to at a later stage in the description.

The concrete member forming machine has a base 9 (see FIGURES 2A, 2B, 2C, 2D and 3) forming a bridge over the leg 2 of the transport path, and a platform upon which various stations, where the several required operations are performed, are located. These include (starting at the right end of the machine as shown in FIGURES 2A, 2B, 2C and 2D) a pallet receiving station 10, a cable cutting station 11, a concrete member removal station 12, a pallet header cleaning station 13, pallet cleaning station 14, an anchor inserting station 15, a cable laying station 16, a stressing station 17, a molding and vibrating station 18, and a loaded pallet delivery station 19.

The base 9 is formed of a pair of longitudinally extending, horizontally spaced, vertical walls, or legs, 20, and a flat platform 21 rests upon the tops of the legs. The legs, and a portion of the platform which bridges the legs, forms the tunnel 22, through which the transporting kiln cars 8 move. The platform is sufficiently broad to project some distance beyond the legs on either side of the tunnel. It is upon this platform that the various operating stations of the machine are mounted.

Pallet track

When pallets are placed upon the machine, by means to be described, they are loaded upon a pallet track 23 (see FIGURES 2A, 2B, 2C, 2D and 3) which extends the full length of the platform 21. The track is supported upon pedestals 24, arranged in two parallel rows extending longitudinally of the platform, and horizontally spaced angle irons 25 which are supported in pairs on the tops of the pedestals. The angle irons are mounted in horizontally spaced position, and each pair provides a mounting means for the axles of track roller 26. Rollers 26 are located closely adjacent to one another between the respective pairs of the angle irons, to provide two rolling surfaces along transversely spaced lines to support the pallets, and permit them to be moved with little effort along the full length of the machine.

Pallets 27 are moved along the pallet tracks in predetermined increments, and in predetermined spaced relation, by means of pallet-advancing racks 28. These racks comprise elongated bars 29 which extend the length of the tracks, and are supported for longitudinal reciprocating movement in brackets 30 mounted on the pedestals 24. The bars are interconnected by a bridge 31 having a depending arm 32 coupled to a hydraulic cylinder operating assembly 33 anchored to a fixed bracket 34. The hydraulic unit is a double-acting one and, under the influence of controls to be described, it will be operative to shift the pallet-advancing racks rearwardly and then forwardly. Each of the rack bars is provided with a plurality of pallet-engaging dogs 35 (see FIGURES 2B and 3) adapted to abut the rear edges of the several pallets and move them forward. The dogs are pivotally attached to the racks as at 36, and each dog is urged, by means of a spring 37, to its raised, pallet-engaging position. As the racks move rearwardly, the dogs can depress passing under the next succeeding pallet and, when they clear the rear edge of the pallet, spring up into engaging relation with the pallet. On the advancing movement of the racks the pallet will be moved with the rack the full distance of the advancing step. The dogs will be arranged to hold the pallets normal to the track direction during most of the travel, but during a part of the passage through the machine the dogs will hold the pallets at an inclined position, as will be described.

Operation of the pallet advancing racks is controlled, as are most of the other mechanisms of the machine, from a master control shaft 38 (see schematic diagram FIGURE 4). This shaft is rotated continuously by means of a synchronous motor 39 connected to an electric supply source 40. The shaft carries a plurality of cams, one for each mechanism to be controlled, with cam 41 controlling the flow of hydraulic fluid to the advancing rack operating cylinder 33. The cam has a rise 42 which operates a cam follower 43 to shift a double-acting switch 44 from line 45, which includes a solenoid valve 46 to institute advancing movement of the rack, to line 47, which includes a solenoid valve 48 which controls retroactive movement of the rack. The movable arm of switch 44 is connected to the power line 40, and through lines 45 and 47 to the return line 49.

It is to be noted that the rise on cam 41 is but a short part of the operating cycle represented by the full circumference of the cam. All other cams on shaft 38 are set in reference to cam 41.

Car loading mechanism

After the concrete members have been poured, compressed, and vibrated, and the mold box and stripper head raised, the pallet is advanced along the pallet track to the station 19, where it is lifted from the track and loaded onto a kiln car 8 for transportation to the curing tunnel 5.

The car loading mechanism (see FIGURES 2A, 3 and 4) includes a frame 50 having a longitudinally extending track 51 at its top, along which a carriage 52 moves. The carriage has a lift 53 by means of which pallets can be raised from the pallet track and lowered to proper stacked position on the kiln car.

Frame 50 may take any suitable form, and is shown as including vertical members 54 at opposite sides of the machine platform 21. The several members 54 at each side are connected by top rails 55 upon which the track 51 is laid. The track is V-shaped, and carriage 52 has V-groove wheels 56 to ride on the track.

The carriage has a principal beam 57, extending across the machine platform 21 and connected at its ends to short inverted U-shaped channels 58 which form truck frame to mount the wheels 56. There are two wheels, in each truck, and beam 57 is located centrally between the wheels so that a stable, balanced carriage is obtained.

Lift mechanism 53 includes a pair of pallet engaging channels 59, each having a lower ledge 60 over which the upper flanges 61 of the pallets arriving at the removal station will ride. The normal, inoperative position of the channels (see FIGURE 3) is such that the flanges 61 may move freely over ledges 60 and come to rest with the ledges underlying the flanges, so that upon upward movement of the channels the ledges will engage the header flanges and lift the pallet from the pallet track. Channels 59 are mounted upon piston rods 62 of hydraulic cylinder assemblies 63. As the cylinders are operated, the channels 59 will be raised and lowered as required, as will be described in detail.

Carriage 52 is moved along the tracks 51 by means of a cylinder assembly 64, which is connected to the frame 50, as at 65, and has its piston rod 66 connected to the carriage at 67.

A car loading mechanism is set into motion by arrival of a loaded pallet at station 19.

At the time the pallet arrives, the lift carriage 52 must be in its retracted position, that is, at the end of track 51 adjacent the molding station. In this position, the carriage is in contact with the control arm of a switch 68, mounted on frame 50, and holding that switch closed. Swith 68 is connected by lines 69 and 70 with the power line 40. There are two switches 71 and 72, connected in series with one another and with switch 68, which are actuated by a pallet arriving at the loading station. Switches 71 and 72 are located on the pallet track in position to be struck by pallets moving into the station. The closing of switches 71 and 72 completes a circuit through a coil 73 of a solenoid valve controlling the lifting movement of lift cylinders 63. This circuit is from line 40, through lines 69, 70, switches 68, 71, 72, line 74, coil 73 and line 75 to return line 49. This will start the lift moving upwardly.

It will be understood that there will be some clearance between the lift ledges 60 and the upper flanges 61 of the pallet, to permit free movement of the pallets into the station. The initial upward movement of the lift will close this gap and engage the ledges with the header flanges to raise the pallet. One of the pallet engaging channels 59 of the lift carries a switch 76, having contacts 77 and 78 which open and close together, and a contact 79 which operates in opposite phase to contacts 77 and 78. When the pallet header flange contacts switch 76, contacts 77 and 78 are closed and contact 79 opens. It will be seen that contact 77 is in a line 80 which bridges contacts 71 and 72. Thus, even though the pallet is lifted from contact with switches 71 and 72, the circuit through coil 73 is maintained and the lift will continue to rise.

When the lift reaches its top position, the channels 59 will strike switches 81 and 82, mounted on the carriage frame which will complete a circuit to coil 83 of the solenoid valve controlling operation of carriage moving cylinder 64, causing the carriage to start forward. As soon as the carriage begins its forward motion, switch 68 is opened, breaking the circuit through the lift raising control coil 73. The circuit to the coil 83 includes lines 69, 84, switches 81 and 82, a closed switch 85, line 86, coil 83 and line 87 to return line 49. The carriage continues its forward movement until it reaches its extreme forward position, at which time the carriage strikes, and opens, switch 85, mounted in the frame 50, to break the circuit to coil 83 and stop carriage movement.

At the time switch 85 opened, contacts 88 closed. These contacts are in a circuit including the solenoid coil 89 controlling downward movement of the lift. This circuit includes line 40, line 69, line 90, contacts 78 of switch 76, now closed contacts 88, line 91 to coil 89, and line 92 to return line 49. When this circuit is completed by the closing of contacts 88, the lift will start down carrying the loaded pallet. At this time, the carriage is at its forward position, and the pallet is beyond the forward end of the pallet track where it can be lowered onto a car 8 traveling along its orbited path. As the lift moves down, switches 81 and 82 will open.

The first pallet will be lowered to the car bed, or platform, and subsequent pallets will be piled upon the first. After a stack of predetermined number has been completed the car moves forward, as will be described, and a new stack is started. The fact that the weight of the pallet is carried by the lift channels, and this weight is used to actuate switch 76 and its contacts 77, 78 and 79, the lift lowers the pallet to a position of rest on the car bed, or upon previously loaded pallets, as the case may be, and the lowering action automatically ceases when the pallet comes to rest. When the pallet load is removed from the lift channels, switch 76 operates to open contacts 77 and 78, and to close contacts 79. This opens the lift lowering circuit through coil 89, opens the auxiliary contacts 77 in the lift raising circuit through coil 73, and closes a circuit through coil 93 of the valve controlling backward movement of the carriage. The circuit through coil 93 includes line 69 from the power line 40, line 94, switch 95 (operating with switch 68 in opposite phase), switch 79, line 96, coil 93, and line 97 to return line 49. When this circuit is closed, the carriage moves back to its position over the pallet track.

As the carriage starts back, switch 85 is closed (but as switches 81 and 82 are open the carriage forward circuit remains open) and contacts 88 are opened. When the carriage reaches its fully retracted position, it strikes and opens switch 95 to break the carriage retracting circuit and stop motion of the carriage. Switch 68 closes simultaneously with the opening of switch 95.

The closing of switch 68 completes a circuit through bridge line 98 and limit switch 99 (now closed) to coil 73, to start the lift moving upwardly. The lift rises until it strikes switch 99, mounted on the frame, and opens the circuit to coil 73. As all of the switches in the several parallel circuits to coil 73 are now open, with the exception of switch 68, the lift stops. The switch 99 is located so that the lift stops with the channels 59 properly located to receive another pallet as it moves into the station.

*Kiln cars*

Kiln cars 8, upon which the pallets with molded concrete members thereon having the stressing cables held under tension are loaded and transported, may have any desired construction so long as they are provided with a flat bed 100 mounted upon wheels 101 for movement along track 102, laid through tunnel 22 provided in the base 9 of the forming machine between the walls 20 and bridged by the platform 21. The cars must also be provided with depending members for engagement with car advancing means and car positioning means to be described. To this end, the cars have centrally located, depending end plates 103, fixed to the car bed ends and extending downwardly beneath the car bed and car axles 104 (see FIGURES 2A, 2B and 2C).

*Kiln car advancing means for machine leg of path*

During loading of a car 8, the car is moved forward step-by-step as previously mentioned, as the stacks of loaded pallets are completed. The stepped movement of the cars is merely sufficient to advance the car to permit the loading of another pallet stack. This movement is accomplished by means of car advancing means 105 (see FIGURES 2A, 2B, 2C, 5, 6 and 7). This consists of a frame 106, mounted between the rails of track 102 near the entrance end of the forming machine, an advancing bar 107, slidably mounted on the frame and having a plurality of spaced pusher dogs 108, and a back-roll preventing mechanism including a plurality of holding latches 109 pivotally connected to the frame 106.

Frame 106 has parallel side members 110, held in proper spaced relation by cross-members 111. Guide rails 112 are held above the frame by brackets 113 mounted on the cross-members. Elongated connectors 114 slide horizontally between the guide rails and carry a plurality of pusher dogs 108. The dogs are pivotally attached to the connectors at spaced points, as at 115, and are provided with stops 116 to contact stop lugs 117 on the connectors to limit the upward movement of the car engaging ends 118 of the dogs. Springs 119, fixed to the dogs and connectors, yieldingly hold the dogs in operative position to engage the end plate 103 of a car positioned above the advancing means. The dogs are free to rock downwardly to pass under plates 103 during retractive movement of the connectors. The dogs are spaced apart a distance equal to the pusher stroke. The stroke is accomplished by means of a cylinder assembly 120, fixed to the frame and having its piston rod 121 secured to the connector 114. Thus, operations of the cylinder 120 will result in horizontal reciprocatory movement of the pusher dogs to advance the cars the required step and retract to prepare for another pushing movement.

In order to prevent back-roll of the cars, the latches 109 will engage the car end plates upon release by the pusher dogs. Latches 109 are weighted levers, pivoted at 122 to brackets 123 mounted on the frame. The latches are free to rock down as the car end plates pass over them, and will rock automatically to latching position.

It is necessary that the cars be accurately positioned at the loading station so that the stacks will be properly located. The car location is assured through use of car-positioning means 124, adjacent the loading position, to be operative upon the particular car at that location. This includes a fixed frame 125 having brackets 126 permanently connected to it. Positioning dogs 127 are pivoted to the brackets, at 128, to allow for substantially vertical swinging movement of the dogs, to permit their hooked, free ends 129 to engage and release the car end plates 103. The dogs are raised and lowered by links 130 which have their ends pivotally connected at 131 to the dogs, and at 132 to a horizontally slidable bar 133. Bar 133 is connected to the piston rod 134 of a cylinder assembly 135 mounted on the frame. Cylinder 135 is a single acting one, and the bar is returned to its original position by a spring 136.

As the entire movement of the kiln cars 8, that is along the machine leg 2 of the orbital path, across the transfer pit 6, along the curing tunnel leg 4 and across transfer pit 7 back to the machine leg, is integrated and interdependent, the controls for the machine leg movement will not be described until the structure of the remaining parts of the car path are described.

*Transfer car*

After a kiln car 8 is loaded at the pallet unloading station 19, it is moved onto a transfer car 137, in the transfer pit 6, for transfer from the machine leg 2 of the kiln car orbit, or path, to the curing tunnel leg 4 of that path. The movement of the kiln car onto the transfer car is accomplished partly by operation of the car advancing means 105 and partly by means carried by the transfer car, as will be described.

The transfer car (see FIGURES 1, 2A, 8 through 14) is shown as comprising a frame 138, having side sills 139 which carry journal boxes 140. Axles 141 supporting flanged wheels 142 are rotatably mounted in the journal boxes. The car rides upon rails 143 laid on the floor of pit 6. Sills 139 are spaced apart transversely of the car by beams 144, and rails 145 are mounted upon them to support kiln cars. Stops 146 are secured at the ends of the rails 146 to limit travel of the kiln cars on the transfer car.

Kiln cars are moved onto the transfer car a prescribed distance by the advancing means 105, whereupon a car puller 147 becomes operative to draw the car the remaining distance to bring the kiln car wheels into contact with the stops 146. The car puller is constructed as a subassembly, including side frames 148 held in spaced, parallel relation by cross-members 149. This sub-frame is bolted to the transfer car main frame 138 at the side farthest removed from the forming machine. Sprocket wheel shafts 150 and 151 are mounted in the side frames 148, and carry sprockets 152 and 153 around which a chain 154 travels. The chain has a puller-dog 155 attached to it that is adapted to contact the depending end plates 103 of kiln cars and draw the cars fully onto the transfer car and hold the kiln car wheels in contact with stops 146. Shaft 151 carries a sprocket 156 over which is trained chain 157 which also passes over sprocket 158 on a motor and speed reducer unit 159.

The operation of puller chain 154 is controlled in part by switches 160 and 161 carried on brackets secured to one of the side frames 148. The switches are actuated in alternation by means of a cam 162 mounted upon a shaft 163 journalled in side frame 148. The cam is rotated by a sprocket 164 on shaft 163 through chain 165, from sprocket 166 carried by shaft 150.

Transfer car 137 is moved along rails 143 by means of a sprocket 167 traveling along a chain 168. The chain is anchored at its ends, as at 169, to the pit floor adjacent the pit ends. The chain lies free on the pit floor, and is trained about idler sprockets 170 on the car and over drive sprocket 167. Sprocket 167 is mounted on shaft 171 journalled on the car frame. Shaft 171 also carries a sprocket 172 driven from motor 173 by chain 174. Motor 173 is a variable speed one, and has its speed controlled by arm 175 which carries a cam roller 176. Cam track 177 is fixed upon supports on the pit floor and provides a cam surface along which cam roller 176 rides as the transfer car moves across the pit. As the roller raises and lowers in accordance with the cam track contour, arm 175 is rocked to actuate motor control 178.

When a kiln car has been drawn fully into the transfer car, controls (to be described) will cause the transfer car motor to be energized, and the car will move along the pit rails 143. Upon reaching the far side of the pit 6 the transfer car will stop with its rails 145 in alignment with rails 179 laid along the floor of the kiln, or curing tunnel, 5.

At the top of the wall of pit 6, facing the kiln car path 4 through the tunnel, there is a kiln car pushing assembly 180 (see FIGURES 1, 13, 14 and 15), which initiates the movement of the kiln car off of the transfer car into the tunnel tracks 179. This assembly includes a base plate 181, fixed to the top of the pit wall, upon which a cylinder 182 having a piston rod 183 is mounted. A pusher plate 184 is fixed to the piston rod to contact the depending end member 103 of the kiln car. When the piston rod is extended, a kiln car will be pushed from the transfer car a sufficient distance for the kiln car to be picked up by car advancing means 185 located in the tunnel 5.

*Kiln car advancing means curing tunnel leg*

The car advancing means (see FIGURES 13 and 14) 185 is essentially the same as that for moving the cars along the machine, or casting, line. It consists of a frame 186 mounted on the tunnel floor and supporting a hydraulic cylinder 187. The piston rod 188 of the cylinder assembly is connected to a slide 189, mounted for movement along the frame 186 and carrying a pusher dog 190. The dog is pivotally connected to the slide so that it can swing under the kiln car projections 103 on the retractive stroke, and a spring 191 brings the dog back to operative position. The principal difference between the advancing means 185 and the one on the machine side of the unit lies in the length of the cylinder stroke. The advancing means in the tunnel has a stroke equal to a car length, so that each stroke a kiln car will be drawn into the tunnel from a transfer car in pit 6 and a kiln car will be pushed from the tunnel onto a transfer car in pit 7.

It is necessary to hold the kiln cars precisely positioned in the curing tunnel as it was along the casting line. To this end, a positioning assembly 192 is located at the discharge end of the tunnel. Here again, the structure is similar to that used on the casting line side, but only one positioning arm 193 is used as each stroke is one entire car length. The arm is pivotally connected to a frame 194 and operated by link 195 through hydraulic cylinder assembly 196. The positioner arm 193 will be lowered by operation of cylinder 196 in timed relation to the operation of the advancing means 185 so that cars may be pushed from the tunnel in timed sequence.

Cars pushed from the tunnel move onto a transfer car 137' in the pit 7. This transfer car is constructed exactly the same as the one previously described for pit 6. The sequence of operation is different, but the structure and controls are similar. Parts of the transfer car 137' are indicated by the same reference numerals primed as similar parts of the car 137.

When a kiln car is pushed onto the transfer car 137', the kiln car is picked up by the car puller assembly 147', and drawn into abutment with the stop 146' as before. Motor 159' then drives the transfer car along the pit until the car rails 145' are in alignment with track 102 of the casting machine leg of the kiln car orbit.

Car 8 receives its initial movement from the transfer car from a pusher assembly 180' at the edge of pit 7 in alignment with track 102 (see FIGURES 1 and 5). The assembly is identical with assembly 180 at pit 6 and similar parts have been given similar reference numerals primed. It is sufficient at this point to state that the pusher stroke is long enough to move the car to a position where it will be engaged by the casting line car advancing means 105. Thereafter, the car advancing means will control movement of the car which will be in increments equal to the distance center-to-center of pallet stacks on the car.

*Kiln car advancing means and transfer car control system*

As mentioned above, the several kiln car advancing means and positioning means, as well as the transfer cars have an integrated control system, which ensures proper timed operation of the various parts with respect to each other and with respect to movement of pallets along the pallet path on the casting line.

When a kiln car is fully loaded with cross tie-bearing pallets, it is moved step-by-step by the casting line car advancing means 105 onto the transfer car 137 until the leading downward projector 103 of the car has reached a position overlying the chain 154 of the car puller mechanism 147. At this time, the car strikes a normally open switch 197 located on the kiln car track 145 which closes a circuit through the motor 159 to start the puller chain moving. The puller dog 155 will contact the car end plate projection 103 to draw the kiln car fully onto the transfer car into contact with the stops 146. The circuit includes a line 198 from the power source 40, line 199, switch 197, switch 160 on the transfer car, the coil of a motor starting relay 200 and wires 201 and 202 to return line 49. Energizing relay 200 closes its contacts 203 in a line 204 bridging the switch 197. Thus, the switch 197 need be closed only momentarily, as a holding circuit is established through line 204 and contacts 203. When the kiln car is in loaded position, the cam 162 will have operated to open switch 160 to stop the puller mechanism motor. Car 8 strikes a switch 205 on the transfer car as it reaches loaded position, engaging motor starting relay coil 206 and starting the transfer car motor 173 to set the transfer car in motion. This circuit includes wire 198, line 207, switch 205, a switch 208 on the transfer car, switches 209 and 210, which are in the car advancing assemblies 105 and 185 to indicate those assemblies are properly positioned before transfer car movement starts, relay coil 206 and line 211 to line 202. Contacts 212 of relay 206 are in a holding circuit 213 bridging switch 205.

As the transfer car reaches the end of pit 6, it strikes and opens normally closed switch 208 to stop movement of the transfer car.

In addition to actuating switch 208, the transfer car also strikes and closes switch 214 when it reaches the pit end at the kiln side. This closes a circuit through solenoid valve coil 215 to initiate advancing movement of the pusher plate 184 of the cylinder assembly 180, which pushes the kiln car part way off the transfer car onto the rails 179 in the drying tunnel. At the same time, switch 216 is closed to start the car pulling motor 159 in reverse to run the puller dog 155 away from the car end plate 103 to permit the cylinder assembly 180 to push the kiln car from the transfer car. The cylinder assembly circuit includes wire 198, line 217, switch 214, switch 218 on the cylinder assembly, coil 215 and line 219 to line 202. When pusher plate 184 reaches its limit of travel, it strikes and opens switch 218 to break the circuit and halt the pusher plate. The motor 159 reversing circuit includes line 198, line 220, switch 216, switch 161 on transfer car, reversing starter relay coil 221 for motor 159, and line 222 to line 202. Operation of switch 161 by cam 162 breaks the motor reversing circuit. A holding circuit 223, including relay contacts 224, is used in the motor reversing circuit, so that a momentary pulse is all that is required to start the motor.

As the kiln car is pushed from the transfer car to the tracks 179 in the kiln, it strikes switch 225 on the kiln floor to operate a solenoid valve 226 to allow liquid to enter cylinder 187 of the car advancing means 185, to pull the car into the kiln. At the same time, positioning cylinder 196 is operated through solenoid valve 227 to retract positioning arm 193 so that the end kiln car can be pushed out of the kiln onto the transfer car 137' in the pit 7. Closing switch 225 actually energizes two relay coils, a control relay 228 and a timer relay 229, and these relays actuate a number of circuits. The relays are energized through line 198, line 230, switch 225, switch 231 on the advancing cylinder 187, line 232 to coil 228 and wires 233 and 202. A branch line 234 is connected to line 232, and connects coil 229 from line 232 to line 202. When relay 228 is energized it closes contacts 235 to complete a holding circuit 236 and switch 225.

The solenoid 226 is energized to cause car advancing means 334 to draw the kiln car into the kiln when the control relay 228 is energized and the relay contacts 237 are closed. This completes a circuit from line 198 through wire 238, contacts 237, and solenoid valve 226 to line 202. This circuit remains operative until cylinder 187 completes its stroke and opens switch 231 to break the circuit to relay 228.

The solenoid valve 227 of the positioning assembly 192 is energized also by the operation of the relays 228 and 229. When relay 228 operates, it closes contacts 239, and when relay 229 operates it closes contacts 240, thereby completing a circuit through line 241 from line 198, through contacts 239 and 240, and solenoid 227 to wire 202. This draws down the positioning arm 193 allowing the cars in the kiln to be moved. The arm stays down for the timed period of relay 229, whereupon contacts 240 open, and relay 229 contacts 242 close and energize solenoid 243 of the positioning assembly to return the positioning arm to operative position. When the arm contacts a kiln car end plate it opens switch 244 and de-energizes the solenoid 243.

After the above operations are complete, the car advancing means 185 actuates switch 231 to open the circuits through the relays. This permits contacts 245 of relay 228 to close, energizing solenoid 246 to reverse the operation of the car advancing cylinder. Contacts 245 and solenoid 246 are connected in series across lines 198 and 202 by means of line 247.

The transfer car can be returned to its original position in alignment with the kiln car track at the casting line side of the unit as soon as the kiln car is moved from it.

In order to make the return movement of the transfer car dependent upon the removal of the kiln car, a photoelectric cell 248 is mounted upon the transfer car at one side (see FIGURE 8) and a light source 249 is located at the opposite side of the car. The cell and light source are mounted adjacent the entrance side of the transfer car so that a kiln car on the transfer car will block the light during transfer from one side of the pit to the other and during removal of the kiln car from the transfer car. As soon as the kiln car moves off the transfer car the cell is energized. This completes a circuit from the wire 198, through wire 250, photo cell 248, switch 251 at the casting line side of pit 6, and the coil of reversing relay 252 for the transfer car motor. The relay closes contacts 253 in a holding circuit 254 around the photo-electric cell. When the transfer car reaches its original position, it strikes and opens switch 251 to stop the motor.

When a kiln car is drawn from transfer car 137 into the kiln tunnel, a car at the opposite end of the kiln is pushed onto transfer car 137′ in pit 7. The kiln car is drawn the last part of the movement onto the transfer car by the car puller assembly 147′, as described in connection with the sequence of operation in pit 6. In fact, the kiln car is loaded and the transfer car moved across the pit in precisely the same manner as in pit 6, except that the kiln car advancing means on the kiln side of the orbit has a stroke equal to a kiln car length, whereas on the casting line side the advance is by increments equal to the distance center-to-center of pallet stacks on the kiln car. When the transfer car 137′ reaches the casting line, it stops, and cylinder assembly 180′ pushes the kiln car part way toward the casting machine. The car advancing means 105 on the casting line then engages the kiln car and the kiln car will be moved in increments off the transfer car 137′ and along the casting line. When the kiln car moves from the transfer car 137′, the photo-electric cell becomes operative to return the transfer car to the kiln side of the orbit. The car will arrive before car 137 in pit 6 arrives at the kiln side to unload a kiln car.

*Pallet loading device*

As the kiln car starts down the casting line track, it first arrives at the pallet receiving station 10, where a loading device 255 lifts the pallets containing cured concrete members singly from the car and places them on the pallet track 23 (see FIGURES 2A and 17. The kiln car unloading device is a structural duplicate of the one at the pallet removing station 19, but reversed in position and having a somewhat different control system.

Loader 255 is located at the approach end of the machine platform 21 and has a frame 256 supported on the platform. The frame carries horizontal rails 257, upon which carriage 258 rides to move from a position overlying a pallet stack position on the kiln car to a position overlying the pallet track. The carriage includes a lift mechanism 259. As the structure just mentioned is the same as at the pallet removing station 19, it is not thought necessary to describe it in more detail. The carriage is moved by a cylinder assembly 260, and the lift is raised and lowered by another cylinder assembly 261. The lift carries a pair of pallet engaging channels 262 to embrace the pallet header upper flanges to enable lifting of the pallets.

When a kiln car moves into position at the pallet receiving station, the lift channels 262 will be at the proper height to move back into embracing relation with the upper flanges of the headers of the top pallet of the first stack in the car. The lift will then rise to its top position, the carriage will move forward to carry the pallet over the pallet track, and then lower to seat the pallet on the track. The pallet advancing cylinder 33 will actuate to move the pallet forward out of the lift channels. The lift will then lower until its channels are at the level of the next lower pallet of the stack on the kiln car, and the carriage will move rearwardly to engage the channels with the pallet headers. The lift will raise, and the carriage will move forward to bring the pallet over the pallet track as before. This action will be repeated, with the lift channels moving down one step lower each operation to engage the next lower pallet until all of the pallets of the first stack have been removed. The kiln car will then move forward one stack position, and the cycle will be repeated.

The control system for the pallet loading device is shown in FIGURE 17. The circuit will be connected into the main power line 40 and the return line 49. The circuit includes a pair of impulse counters 263 and 264, a relay 265 having normally open contacts 266 and 267 and normally closed contacts 268 and 269, solenoid coils 270 and 271 for controlling the valves of lift cylinder 261 to raise and lower the lift, respectively, and solenoid valves 272 and 273 for the valve of carriage cylinder 260 to move the carriage forwardly and rearwardly, respectively, and a number of limit switches.

When a pallet has been placed upon the pallet track, switch 274, located at the track, is opened breaking the circuit to the lift lowering coil 271 so that the loading device is at rest. If this is the bottom pallet of a stack removed from a kiln car, the counter 263 will have its counter hand 275 at 0 contact of its counter contact series 276, and the counter 264 will have its hand 277 at the No. 1 contact of its counter contact series 278. The coil of relay 265 will be de-energized, so that contacts 266 and 267 will be open and contacts 268 and 269 will be closed. The loader is now ready to begin its cycle, which includes the moving of all pallets of one stack on a kiln car onto the pallet track.

As the pallet advancing mechanism operates to move the pallet out of the pallet receiving station, switch 274 closes completing a circuit to the solenoid 271 to shift the control valve for cylinder 261 to start the lift downward. This circuit includes wires 279 from line 40, wire 280, closed contacts 168 and 169, line 281, closed contacts 274 and 282 (on the loader frame, and closed by the carriage when in forward position), coil 271 and line 283 to return line 49. As the lift lowers, an arm of a switch 284, located on the carriage adjacent one of the lift guide rods 285, will fall into the first of a series of notches, or recesses, 286 on the rod 285. The number of recesses will be equal to the number of pallets in a stack. As switch 284 operates, it closes a circuit through the counter coil 287 of counter 263, through wire 288 from line 40 to line 49, and causes the counter hand 275 to move to the No. 1 contact. As the hand 277 of counter 264 is also at its No. 1 contact, a circuit is closed energizing relay 265 to close contacts 266 and 267 to complete a circuit through solenoid coil 273, to start the carriage moving back to the kiln car position. Contacts 268 and 269 open to break the circuit to solenoid 271 and stop downward movement of the lift. This will position the lift channels 262 at the proper level to engage the top pallet of a stack on the kiln car when the carriage reaches the car position. The circuit through the counter hands includes wire 279, wire 289, hand 275, contact No. 1 of counter 263, wire 290 to contact No. 1 of counter 264, hand 277, and through wire 291 and coil of relay 265 back to line 283. As the carriage leaves the pallet track position, switch 282 in the lift down circuit opens so that the lift cannot move downward until the carriage is again in its forward position.

When the carriage arrives at the kiln car position, the lift channels will embrace the pallet headers, and the carriage actuates a switch 292 located in the elevator frame at the carriage back position. This completes a circuit from line 283 through switch 292, solenoid 270 and line 283 to energize the solenoid and start the lift moving upwardly, raising the pallet from the car. As the lift rises, the switch 284 will recount the recess in the guide rod 285 and the counter hand 275 will move to No. 2 contact. As counter hand 277 is still at its No. 1 contact, the circuit to the coil of relay 265 will be broken and contacts 268 and 269 close, while contacts 266 and 267 open. This opens the circuit through the carriage back solenoid 273. When the lift reaches its upper position, it closes a switch 293 which completes a circuit from wire 279, through wire 294, solenoid 272, controlling forward movement of the carriage, and wire 283. At the same time, a switch 295 in the carriage back circuit is opened. The carriage will now move forward, and switch 292, in the lift up circuit will open.

When the carriage arrives at the forward position over the pallet track, it will strike and close a switch 296. This switch is included in circuits to a coil 297 which releases counter hand 275 and returns it to zero, and a coil 298 which is the counter coil for counter 264 and causes the hand 277 to advance to the No. 2 contact. At the same time that switch 296 is closed, switch 282 will close completing the circuit to the solenoid coil 271 so that the lift will start to move downwardly. When the pallet seats on the track, switch 274 will open, breaking the circuit through the coil 271 and stopping the downward movement of the lift.

This operation completes one cycle of transfer movement of the elevator. As soon as the pallet on the track moves forward a second transfer cycle will begin. This will be the same as the first, except the lift will move to a lower level, due to the fact that the counter hand 277 is at the No. 2 contact and the switch 284 will have to pass two recesses 286 on the guide rod 285, to bring the hand 275 to its No. 2 contact to complete a circuit through the counter connecting wire 299 to the coil of relay 265, to open contacts 268 and 269 to break the circuit to coil 271 and so stop downward movement of the lift. Thus, each transfer cycle, the hand 277 will advance to the next higher contact and it will be necessary for the lift to move lower so that the switch 284 can count an additional recess before a circuit will be completed to stop the lift downward movement. This will bring the lift channels to the proper level each transfer cycle to engage the uppermost pallet left on the stack being loaded on the machine.

When the counter hand 277 has reached contact No. 6, which is the total of the stack height illustrated, the counter hand 275 will move to its contact No. 12 during the recess re-count as the lift rises. This will complete a circuit from wire 279 through wire 289, hand 275, contact No. 12, line 300, release coil 301 for counter 264 to line 283. This will return the counter 264 to zero and complete a stack loading cycle. The kiln car will now be advanced to bring the next stack to loading position and the cycle will be repeated.

*Control integrating kiln car and pallet movement*

It is essential that the operation of the unloader at the pallet removing station 19 and the loader at the pallet receiving station 10 be properly timed with the movement of the kiln cars around their orbit so that the proper number of pallets will be removed from one car and placed upon the pallet track, and an equal number of loaded pallets be removed from the pallet track and stacked on a kiln car prior to movement of the kiln cars. To this end, a control circuit is employed to hold open the kiln car operating circuits until such time as the unloader and loader at the stations 10 and 19 have each completed a full stack transfer cycle. This is accomplished by the use of step counters 302 and 303 at the stations 10 and 19, respectively, and a time delay relay 304 which makes and breaks the circuit controlling the kiln car movement. (See FIGURE 16.)

Counter 302 at the pallet receiving station 10 has a counting hand 305, an arcuate series of counting contracts 306, a counter coil 307 and a release coil 308. Switch 309, which is a normally closed switch, is carried by one of the lift channels 262, on the lower flange, so that when a pallet is suspended from the channels the switch is held open. Thus, each time a pallet is deposited upon the pallet track, switch 309 will close. This completes a circuit from power line 40, lines 310 and 311, switch 309, counter coil 307 and line 312 to return line 49, and causes the counter hand 305 to advance one contact on the series 306. It will be clear that each time a pallet is deposited on the pallet track the counter 302 will make one count.

Counter 303, at the pallet removing station 19 has a counting hand 313, counting contacts 314, counting coil 315 and release coil 316. Switch 317 is in circuit with the counting coil 315 through wires 310 and 312 to actuate the counting coil and move the counting hand one contact each time the switch is closed. Switch 317 is carried by one of the lifting channels 59 at the pallet removal station. Thus, each time a pallet is removed from the pallet track and deposited on a kiln car the counter 303 will count one.

If the pallet stacks on the kiln cars are to contain six pallets, as illustrated, the counters 302 and 303 are connected in a circuit to close the car movement control circuit when the two counters have reached a six count. Therefore, the two counter hands are connected by wire 318, the No. 6 contact of counter 302 is connected by wire 319 with line 40, and the No. 6 contact of counter 303 is connected by wire 320 with return line 49. The coil of relay 304 is in the line 320, so that when the two hands have reached their No. 6 contacts the relay will be energized. This will close contacts 321, 322 and 323 of the relay. Contact 321 is in a bridge wire 324 across the wires 319 and 320 to provide a holding circuit for the relay so that the relay may remain energized even though the counters return to zero. Contact 322 is in a line 325 which connects with the line 40 and the counter release coils 308 and 316. The opposite sides of the release coils are connected to wire 312. It will be clear that when the relay is energized the release coils will be activated to reset the counters to zero. The relay coil is held energized, however, by the holding circuit through contact 321. Contact 323 is in the main supply line 198 for the car moving control circuit, and when the switch closes the car moving system will be operative to advance the kiln cars one step along the casting line track. The relay 304 will be timed to permit one cycle of car movement and then will break the holding circuit, thus breaking the circuit through line 198.

In view of the detailed description of the operation of each mechanism given in conjunction with the description of the structure, together with the explanation of each separate step of movement of the pallets and transporting means, it is not thought necessary to re-state the operation of the apparatus as a whole.

It will be apparent that the entire operation of preparing the pallet, inserting stressing cables, tensioning the cables, pouring the concrete member, curing the member and removing it from the pallet takes place in a continuous, automatic cycle. The pallets hold the cast units with cables tensioned during the entire time the members are in the pallets. The arrangement permits the removal of pallets from the casting line onto transporting means for passage through a curing tunnel, and a reloading of the pallets with cured units onto the opposite end of the casting line. The orbital path of the transporting means carries the kiln cars to the loading end of the casting machine and beneath the machine to proper position for unloading the freshly cast units from the casting line.

Although a detailed description of one practical embodiment of the invention has been given, it will be apparent that the details of structure shown and described are merely for purposes of illustration and the invention may take other forms within the scope of the appended claims.

What is claimed is:

1. Apparatus for making prestressed concrete members comprising, an endless path having spaced forming-machine and curing tunnel legs, a transfer pit at each end of said legs bridging the said legs, a curing tunnel housing the curing tunnel leg of the path and a concrete member forming machine overlying a portion of the machine leg of the path and having an entrance end and an exit end above the path, a plurality of kiln cars on the path in end-to-end abutment along the curing tunnel and forming machine legs of the path, a plurality of pallets in which concrete members can be formed and cured carried in stacks on the cars and singly along the forming machine, means at the entrance end of the forming machine to transfer pallets singly from kiln cars onto the forming machine, means to move pallets along the forming machine step-by-step, means at the exit end of the forming machine to remove pallets singly from the forming machine and stack them on kiln cars, transfer cars in the respective transfer pits to move kiln cars singly from the forming machine leg of the path to the curing tunnel leg and from the curing tunnel leg to the forming machine leg, means to advance kiln cars along the forming machine leg of the path in increments equal to the spacings between pallet stacks on the kiln cars, means to advance kiln cars along the curing tunnel leg of the path in increments equal to the length of a kiln car, means on the transfer cars to draw kiln cars onto them, and means at the ends of the transfer pits adjacent the leg of the path to which kiln cars are being moved to move kiln cars from transfer cars into engagement with the kiln car advancing means of the respective path.

2. Apparatus for making prestressed concrete members as claimed in claim 1 wherein, the forming machine has a plurality of operating stations along its length to which pallets are moved by the step-by-step pallet moving means, the stations including, a cable cutting station, an article removing station, a cable laying station, a cable stressing station and a concrete molding station.

3. Apparatus for making prestressed concrete members as claimed in claim 1 wherein, means to move the transfer cars along their respective pits from the leg of the path from which kiln cars are loaded on the transfer cars to the leg of the path to which kiln cars are delivered set into motion by movement of a kiln car onto the transfer car, and means to return the transfer cars to their starting position set into motion upon movement of a kiln car completely off of the transfer car.

4. In apparatus for making prestressed concrete members as claimed in claim 3 wherein, the means to advance kiln cars along the curing tunnel leg of the path is set into motion by movement of a kiln car from a transfer car onto the curing tunnel leg of the path, and the means to advance kiln cars along the forming machine leg is set into motion by means which includes a counter controlled by the loading of pallets onto the forming machine and is operative when the counter reaches a count equal to the number of pallets in a stack on the kiln car.

5. Apparatus for making prestressed concrete members as claimed in claim 1 wherein, the means to move kiln cars onto transfer cars includes a chain having means to engage the kiln cars, and fixed stops on the transfer cars against which kiln cars are moved by the chains to hold kiln cars in fixed predetermined position on the transfer cars.

6. Apparatus for making prestressed concrete members as claimed in claim 1 wherein the means at the exit end of the forming machine to remove pallets singly from the forming machine and stack them on kiln cars comprises, a frame having rails thereon extending from a pallet pick-up position on the machine to a point overlying a kiln car on the machine leg of the path, a carriage movable along the rails, a lift on the carriage to lift pallets from the machine and lower them to the kiln car, means to move the carriage along the rails, means to raise and lower the lift, means to position the lift at pallet pick-up level when the carriage is at the pick-up station, and means to stop the lowering movement of the lift at the kiln car position when the weight of the pallet is removed from the lift by seating on the kiln car.

7. Apparatus for making prestressed concrete members as claimed in claim 1 wherein the means at the entrance end of the forming machine to transfer pallets singly from kiln cars onto the forming machine comprises, a frame having rails thereon extending from a position overlying a kiln car on the machine leg of the path to a pallet deposit position on the machine, a carriage movable along the rails, a lift on the carriage to lift pallets from the kiln car and lower them onto the machine, the lift having channel-shaped pallet-engaging means, means to lower the lift including a counter to cause the lift to lower one pallet height additional each successive lowering operation in a cycle equal to the number of pallets in a stack on the kiln car, means to move the carriage from the pallet deposit position to the kiln car after a lift-lowering operation so that the channel-shaped engaging means will embrace the flanges of the top pallet of a stack on the kiln car, means to stop lowering movement of the lift when the weight of the pallet is on the machine at the deposit position, and means to move the pallets horizontally of the machine to move pallets out of the channel-shaped engaging means of the lift.

References Cited

UNITED STATES PATENTS

| | | | |
|---|---|---|---|
| 1,560,618 | 11/1925 | Stevens | 25—142 |
| 2,901,808 | 9/1959 | Muehleck et al. | 25—2 |
| 3,189,971 | 6/1965 | Derror | 25—2 |
| 3,128,521 | 4/1964 | Baker | 25—118 |

FOREIGN PATENTS

| | | |
|---|---|---|
| 306,762 | 2/1929 | Great Britain. |
| 769,720 | 3/1957 | Great Britain. |

J. SPENCER OVERHOLSER, *Primary Examiner.*

R. D. BALDWIN, *Assistant Examiner.*